INVENTOR.
Paul D. Henderson
BY
Johnson and Kline
ATTORNEYS

United States Patent Office 3,462,563
Patented Aug. 19, 1969

3,462,563
TAP CHANGING MECHANISM WITH SCOTCH YOKE ACTUATOR
Paul D. Henderson, Avon, Conn., assignor to The Superior Electric Company, Bristol, Conn., a corporation of Connecticut
Filed Jan. 8, 1968, Ser. No. 696,363
Int. Cl. H01h *19/58, 21/78*
U.S. Cl. 200—11          9 Claims

ABSTRACT OF THE DISCLOSURE

A switching mechanism for normally connecting at a time only one pair of a plurality of pairs of inputs to output terminals and which upon actuation sequentially connects the next pair of inputs to the output terminals while disconnecting the last pair and in which the disconnection is effected after the connection.

---

The switching mechanism of the present invention has particular utility when employed in a variable voltage transformer of the type disclosed in U.S. Patent No. 2,976,476, granted Mar. 21, 1961, and assigned to the assignee of the present invention. This type of transformer provides an output voltage that is essentially steplessly adjustable between its limits and is capable of handling more electrical power than the conventional commutating type autotransformer which also provides for stepless adjustment. Thus, where the latter may be practically limited to 5 to 7.5 kva. the former may control for example 200 kva.

The disclosed variable voltage transformer includes an input transformer unit that subdivides the input voltage into a plurality of voltage increments of generally equal magnitude. A commutating coil is also provided and the coil is divided into two seperate windings both on the same core with a brush being movable along the windings to commutate with the turns engaged thereby. A switching mechanism is connected between the transformer unit and the commutating coils and is operated in direct relation with the movement of the brush and serves to connect the proper voltage increment to the proper windings. Rotation of the brush will cause one increment to be connected to one winding, the next increment to the other winding, the third increment to the one winding, etc., so that each sequential increment is connected to the unconnected winding and alternate increments are connected to the same winding.

The value of the output voltage of the transformer is adjusted by rotation of the brush and occurs between the brush and a connection to the first increment. The increments each have a set value of voltage and the output voltage is thus the sum of the increment voltages connected between the first increment and the brush plus the value of the adjustable voltage added by the commutating coil which is a fraction of an increment.

While this structure of a variable transformer provides a steplessly adjustable output voltage and higher power capacity, the switching mechanism however as disclosed in said patent has not been completely satisfactory. One difficulty is that the switching mechanism uses sliding contact which not only may provide poor electrical connection but moreover they are insufficiently durable and incapable of handling large quantities of power.

It is accordingly an object of the present invention to provide a switching mechanism which may be utilized in such a variable transformer and yet which is capable of controlling larger amounts of power over an extended period of use.

Another object of the present invention is to provide a switching mechanism which is extremely simple in construction, relatively economical to manufacture, composed of relatively few moving parts and which eliminates sliding contacts.

A further object of the present invention is to provide a switching mechanism which may be actuated in synchronism with a rotating member such as a brush and which utilizes a rotating movement to effect the switching.

In carrying out the present invention, the switching mechanism is disclosed in combination with a transformer unit and a commutating coil as disclosed in the above-noted patent. The mechanism disclosed herein electrically functions in the same manner as the switching mechanism disclosed in the above-noted patent. Thus the mechanism serves to connect sequential increments to the two windings of the commutating coil with alternate increments being connected to the same winding. Moreover, the connection is made between a winding and its increment prior to the disconnection of the prior connected increment to the other winding so that for certain locations of the brush adjacent ends of the two windings, both windings are connected to sequential increments for the advantages recited in the above-noted patent.

In order to control relatively large amounts of power, the present invention has a plurality of individually movable contact levers with each lever having a contact. The contact is forced against its mating contact whenever an electrical connection is required by mechanically pivoting its lever and the contacts are maintained together by this mechanical force on the lever until further movement of the switching mechanism requires their separation.

The actuation is achieved by conversion of rotary motion into a radially reciprocating movement of an actuator which at its outer positions mechanically engages the contact levers to force them to the closed position. In order to relate the movement of the brush on the commutating coil with the increment that is to be connected to the coil, the actuator is additionally caused to move axially. The contact levers are located in spaced apart relation and aligned with the axis of the actuator and thus only the contact levers aligned with the actuator will be caused to be actuated. Moreover, with this structure, the contact levers are actuated sequentially as required when the switching mechanism is employed in the above-described variable voltage transformer.

As the commutating coil in the specific embodiment hereinafter described is formed into two windings, with each having two ends, the switching mechanism is used to operate two contact levers simultaneously to effect connection of the voltage increments across the ends of a winding at one outermost position of the actuator while at its other maximum outermost position another pair of contact levers are actuated to connect a voltage increment to the ends of the other winding. When the brush of the commutating coil is adjacent the junction of the ends of the windings, the actuator maintains two pairs of contact levers actuated to effect energization of both windings.

Figure 1:
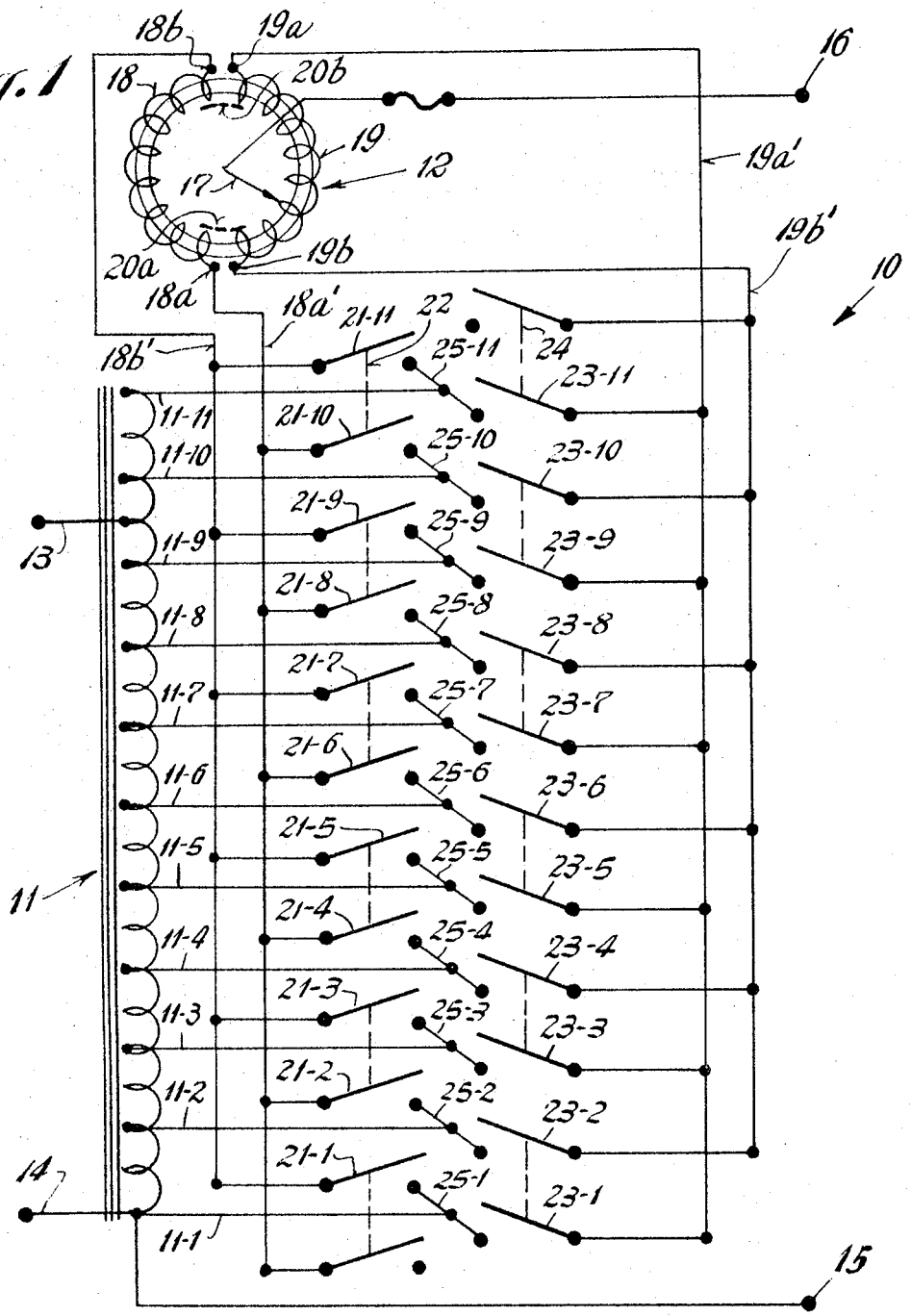
FIGURE 1 is an electrical schematic diagram of a variable voltage transformer having the switching mechanism of the present invention incorporated therein.

Referring to the drawing, FIG. 1, the switching mechanism is generally indicated by the reference numeral 10 and is shown connected between a transformer unit 11 and a commutating coil 12 to form a variable voltage transformer as disclosed in the above-noted patent. The transformer unit 11 has a pair of input leads 13 and 14 connected to a source of A.C. (not shown) while the output of the unit appears across the terminals 15 and 16, the former being connected to the terminal 14 and the latter being connected to a brush 17 operable on windings 18 and 19 of the commutating coil. Movement of the brush provides for a steplessly adjustable value of the output voltage.

The transformer unit 11 subdivides the input voltage into a plurality of voltage increments as by the connection of the wires 11-1 through 11-11 thereto which provides ten voltage increments. While the transformer unit 11 is shown as an autotransformer it will be understood that it could be an isolated transformer if desired. Also while mention is made of voltage increments it will be understood that the value of the voltage between the output lead 15 and any one of the wires 11-1 through 11-11 is the sum of the voltage increments included therebetween.

In the operation of the unit, the switching mechanism is designed to connect alternate voltage increments across the same winding sequentially and to have only one voltage increment connected across one winding except when the brush 17 is positioned adjacent the ends of the winding. The ends are indicated by the reference characters 18a and 18b and 19a and 19b with the location wherein both coils have a voltage increment connected thereto being indicated by the arcs 20a and 20b which occur at approximately the junction of the ends of the windings. Assuming that the brush is at the end 18a of the winding 18 and that the output voltage is zero, rotation of the brush clockwise will cause wires 11-1 and 11-2 to be connected across it so that the voltage increment therebetween is impressed across the winding 18. The output voltage is adjustable within the range determined by the value of the voltage increment. Increased clockwise movement of the brush 17 will bring it into the position where it will be located within the arc 20b whereat it is near the junction of the winding ends 18b and 19a and at this position the switching mechanism will maintain the winding 18 energized but cause the voltage increment between the wires 11-2 and 11-3 to be impressed across the winding 19 by connnection through its ends 19a and 19b respectively.

Further clockwise rotation of the brush 17 will cause it to commutate on the winding 19 and as it leaves the position indicated by the arc 20b, it will effect disconnection of the leads 11-1 and 11-2 to the coil 18 and maintain the coil 18 unenergized from the input leads until the brush approaches the arc 20a when the coil 18 will be connected to the third voltage increments by the wires 11-3 and 11-4. The output voltage is the sum of the voltage increments between the output 15 plus the voltage added by the commutating coil so that by continuous energization of the commutating coil windings by sequential voltage increments, caused by rotation of the brush 17, the output voltage may be adjusted from zero to maximum.

It will be understood that the operation of the switching mechanism must be in synchronism with the movement and position of the brush 17 so that the proper voltage increments will be connected across the correct winding.

Referring to the switching mechanism 10 as shown schematically in FIG. 1, the end 18a is connected to a switch bus bar 18a' while the end 18b is connected to a similar bus bar 18b'. The bus bar 18b' has connected to it in parallel contact levers 21-11, 21-9, 21-7, 21-5, 21-3 and 21-1 while connected to the bus bar 18a', are contact levers 21-10, 21-8, 21-6, 21-4 and 21-2. As voltage must be applied across both ends of the winding the pairs of contact levers that are operated simultaneously are shown connected by a dotted line such as the dotted line 22 between the contact levers 21-11 and 21-10.

The switch components for effecting connection to the winding 19 are similar to the winding 18 and thus the winding end 19a is connected to bus bar 19a' and its other end 19b connected to another bus bar 19b'. As with the bus bars 18a' and 18b', there are a plurality of contact levers connected in parallel thereto and the bus bars 19a' having connection with contact levers 23-11, 23-9, 23-7, 23-5, 23-3 and 23-1 while the other contact levers 23-10, 23-8, 23-6, 23-4 and 23-2 are connected to the bus bar 19b'. As with the winding 18, it is required that there be two contact levers connected to the output bus bars in order to energize the winding 19 with the levers being operated simultaneously and thus there are shown dotted lines 24 connecting the respective pairs.

The contact levers are each electrically connnectible to a contact strip with each strip being connected to an output wire 11-1 through 11-11 of the transformer unit 11. Thus there are contact strips 25-1 through 25-11 connected to the wire. The switching mechanism thus connects through the contact strips, the contact levers and the bus bars, the ends of the windings 18 and 19. As shown, each of the contact levers are normally not engaged with their contact strip. The relative positions of the contact levers and contact strips as shown in FIG. 1 is related to the movement of the brush 17 such that one complete rotation of the brush 17 will be the equivalent of the movement from one pair of contact levers connected to one winding to the adjacent pair of contact levers connected to the same coil. Moreover, the pairs of contact levers connected to the other winding are disposed somewhat between the other pairs to indicate that they are operated alternately therewith.

Figure 2:
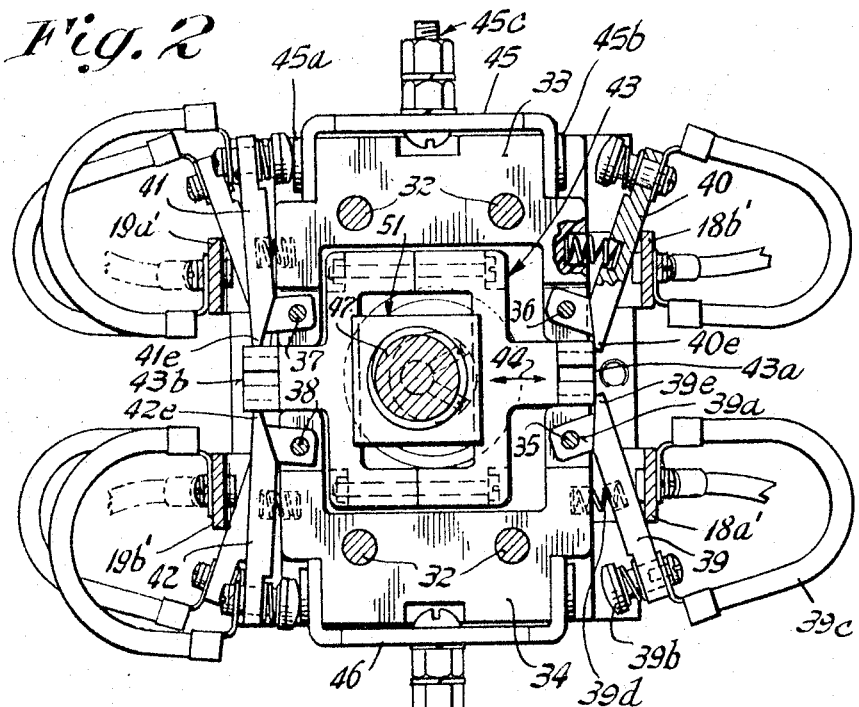
FIG. 2 is a typical section of the switching mechanism taken in the direction of arrows 2—2 of FIG. 3.

Referring to FIGS. 2–5 there is shown the mechanical structure of the switching mechanism. A pair of end plates 30 and 31 are provided and clamped therebetween as by screws 32, and a plurality of aligned upper and lower spacer blocks 33 and 34 respectively. The spacer blocks and end plates are formed of electrically insulated material and have the shape shown. FIG. 2 is a typical cross-section through the switching mechanism and shows the structural arrangement of some of the different electrical elements referred to in connection with FIG. 1. The output bus bars 19a', 19b', 18a' and 18b' are indicated by the same reference character and consist structurally of U-shaped strips of conducting material which have their ends secured to the end plates 30 and 31. They extend along the sides of each of the blocks with the strips 18b' and 19a' extending along opposite sides of the upper block 33 and the strips 18a' and 19b' extending along opposite sides of the lower spacer block 34 with the strips 18a' and 18b' being on the same side of the mechanism and the strips 19a' and 19b' being on the other side.

Further extending between the end blocks are four pivot pins 35, 36, 37 and 38, with the pivot pins 35 and 38 extending through apertures formed on opposite ends of the lower spacer block 34 while the pins 36 and 37 extend through apertures in opposite ends of the upper spacer block 33. The pivot pins serve as the pivot for the contact levers. In FIG. 2, there are four of the many contact levers shown and for convenience are indicated by the reference numerals 39, 40, 41 and 42. The contact levers 39 and 40 constitute one pair of contact levers while the contact levers 41 and 42 constitute the other pair, it being understood that contact levers 39 and 40 could be any pair of the contact levers 21–2 and 21–3, 21–4 and 21–5, etc. that are connectible to the winding 18. While the contact levers 41 and 42 could be any pair of levers 23–1 and 23–2, 23–3 and 23–4, etc. that are connectible to the winding 19.

All contact levers are identical and referring specifically to the contact lever 39, it has an aperture 39a which circumscribes the pin 35 and a contact 39b to which a wire 39c is connected. The contact lever 39 is shown in its open position where it is normally urged as by a spring 39d. On the opposite side of the aperture 39a there is a projection 39e which extends into the space between the upper and lower spacer blocks. Each of the other contact levers similarly has a projection 40e, 41e, and 42e that extends to the space between the spacer blocks and towards each other. The contact levers 39 and 40 are shown in their open position while the contact levers 41 and 42 are shown in their closed position with the movement from one position to the other being about their respective pivot pins.

For effecting movement to the closed position, there is provided an actuator 43 having oppositely extending actuating legs 43a and 43b that extend within the space between the two spacer blocks. The actuator reciprocates in the direction of the arrow 44 so that in its leftwardmost position the actuating leg 43b will engage the projections 41e and 42e to effect closure of the contact levers 41 and 42 while the end 43a is in effect withdrawn within the switching mechanism permitting the springs associated, such as spring 39d, with their contact levers 39 and 40 to urge the contact levers into an open position. The extent of movement of the contact levers in their open position is limited by their engagement with their respective bus bars, such as bus bar 18a', for contact lever 39.

The connections for the wires 11–1 through 11–11 of the transformer unit 11 are contact strips mounted on the upper and lower exterior edges of the spacer blocks. The contact strips are all identical and as shown in FIG. 2, a contact strip that is secured on the upper spacer block is indicated by the reference numeral 45 while a similar strip secured on the lower spacer block is indicated by the reference numeral 46. Referring, for example, to the contact strip 45, it is U-shaped to extend across the spacer block with depending legs so that a contact 45a secured on one leg is positioned to be engaged by the contact of the contact lever 41 and another contact 45b on the other leg is positioned to be engaged by a contact of the contact lever 40. Each contact strip is formed from a bar of conducting copper and has a terminal 45c to which a connection is made to one of the wires of the transformer unit. To correlate the strips with the strips 25–1 through 25–11, the strips 45 on the upper spacer block could be any one of the contact strips 25–1, 25–3, 25–5, 25–7, 25–9 or 25–11 while the contact strip 46 could be any other of the remaining contact strips 25–2, 25–4, 25–6, 25–8, or 25–10.

The present invention employs a rotary motion to effect actuation of the switching mechanism and this motion is imparted to a shaft 47 that is eccentrically mounted on bearings 48 and 49 to extend between the upper and lower spacer blocks. The interior length of the shaft is threaded as at 50 and threadingly engaging therewith is a nut 51. The nut's exterior is essentially square and grooves 51a and 51b are formed on opposite sides thereof. The grooves mate with opposite interior edges 43c and 43d of the actuator 43 so that the nut can move only up and down within the actuator with respect thereto.

With this structure it will be appreciated that as the shaft 47 is rotated, the nut 51 is prevented from rotating by its grooves and the edges of the actuator while the actuator is prevented from rotating by at least one of its legs 43a and 43b being positioned between the upper and lower spacer blocks. Thus the nut will move eccentrically with the shaft 47 and its eccentric movement in other than movement in the direction of the arrow 44 is absorbed in the lost motion connection between the nut and the actuator wherein the grooves slide along the edges. Thus the actuator will move only in the direction of the arrow 44 which is the other component of movement of the nut. The actuator's radially reciprocating movement moreover from one extreme position to the other will require a one-half revolution of the shaft. In addition to the reciprocating movement imparted to the actuator 43, the nut 51 by reason of its engagement with the threads 50 will also move axially along the axis of the shaft 47 and move the actuator therewith.

As it is required to have one pair of contact levers become closed and then a pair on the opposite side of the switch closed and then the closing of the next pair on the same side as the first pair, etc., the contact arms are located by the spacer blocks on both sides of the switching mechanism a distance apart parallel to the axis of the shaft 47 which is equal to the pitch of the threads 50 so that one complete revolution of the shaft causes one actuating leg, such as the leg 43a to actuate the next pair of switches next to the pair that it was actuating initially.

It will be understood that in the embodiment illustrated the threads shown are a four lead thread so that the pitch is actually four times the length between adjacent portions of the threads.

Figure 3:
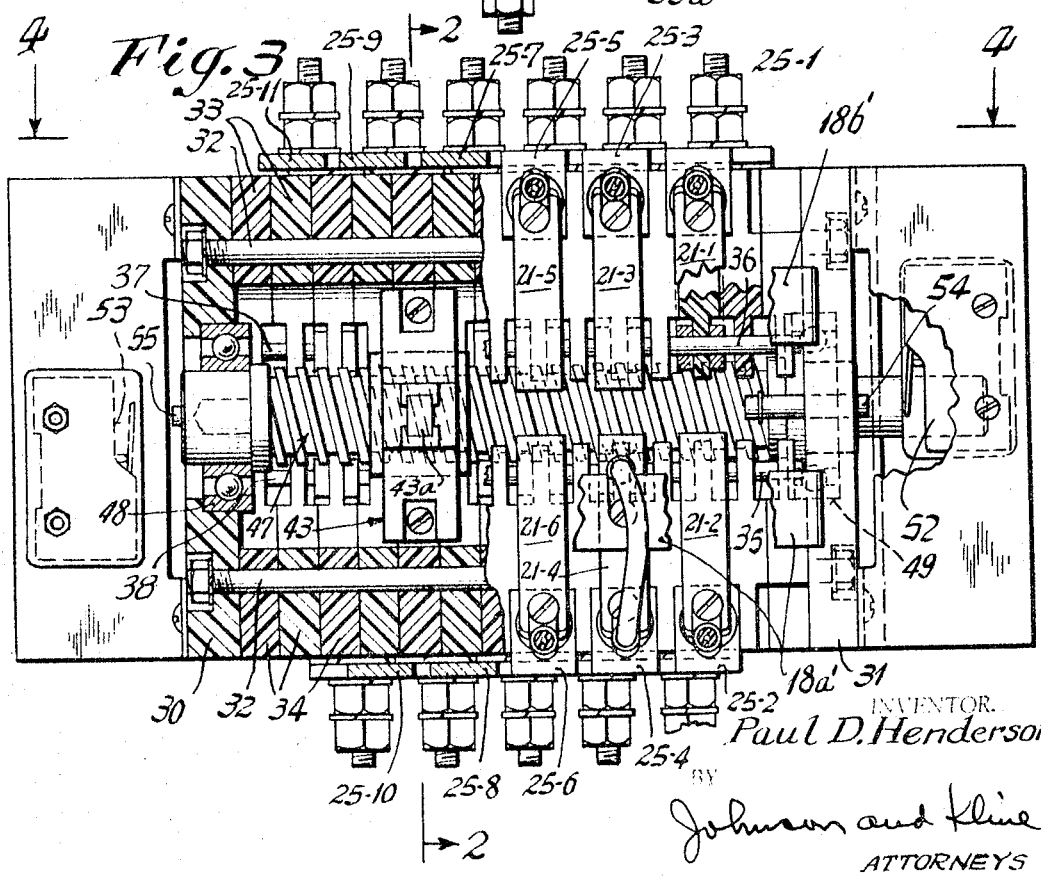
FIG. 3 is an elevation, partly in section.
Figure 4:
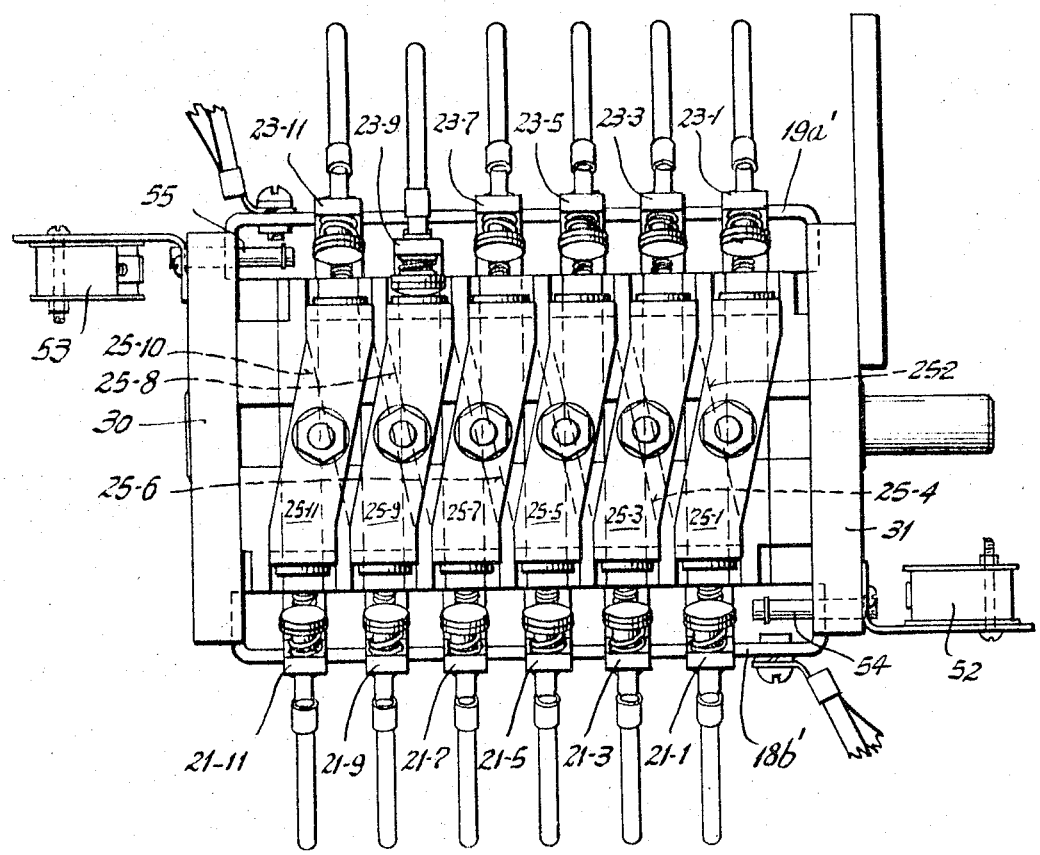
FIG. 4 is a plan view taken in the direction of the arrows 4—4 of FIG. 3.
Figure 5:
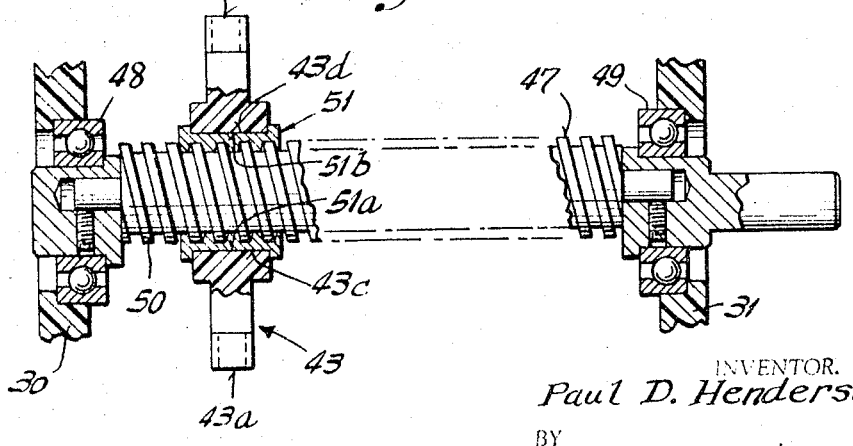
FIG. 5 is a detail of components of the switching mechanism.

As the contact levers are located on opposite sides of the switching mechanism, it will be appreciated from FIG. 3 that the contact levers on the pins 37 and 38 are offset from the contact levers connected to the pivot pins 35 and 36 by one-half a pitch length to provide the desired operation. Thus each of the contact strips 45 is somewhat angled as shown in FIG. 4 so that its contacts 45a and 45b are caused to be in alignment with the respective contacts of the contact levers.

As it is desired to have two pairs of contact levers closed at the same time when the brush is located at positions indicated by the arcs 20a and 20b, the actuating leg 43a is axially longer than the pitch length but is less than two pitch lengths long so that it is capable of effecting closure of two sets of contacts, one for each coil. The actuator is dimensioned so that for the rotational movement of the shaft 47 that corresponds to the arcs 20a and 20b where two pairs of contact levers closed the actuator is at the middle of its reciproating movement.

The different contact levers in the structural views and the different contact strips have been given the same number as indicated on the electrical schematic diagram except for those referred to in FIG. 2.

The switching mechanism is required to be rotated in synchronism with the brush 17 and it is contemplated to operate both by the same motor. It may thus be preferable to define the end movements of the motor as by limit switches 52 and 53 that are actuated by plungers 54 and 55 carried by the end plates and engageable by the actuator.

It will accordingly be appreciated that there has been disclosed a switching mechanism that may be effectively employed in a variable voltage transformer. The mechanism has a plurality of pairs of contact levers that are movable from an open to a closed position. The mechanism utilizes rotary motion to effect sequential closing of the contact levers with normally only one pair being closed at a time. However, selected for rotary arcs of a revolution, the mechanism maintains two pairs of contact levers closed.

Variations and modifications may be made within the scope of the claims and portions of the improvements may be used without others.

I claim:

1. A switching mechanism for sequentially connecting one of a plurality of inputs to an output comprising a plurality of input terminals with each being electrically isolated from the others and having a contact, a plurality of contact levers with there being a lever for each contact, means connecting each contact lever to the output, means mounting each of said levers for movement between a closed position wherein it engages its contact and an open position wherein they are disengaged, a rotary member, an actuator, means mounting the actuator on said rotary member to effect both linear movement along the axis of the member and reciprocating radial movement upon rotation of said member, said actuator having two extreme positions of radial movement, each of said levers having an actuatable portion nad means mounting the actuatable portions in spaced apart relation in alignment with the axis of the rotary member with the actuatable portions being spaced radially of the rotary member as distance which enables the actuator to engage the actuatable portions for one extreme position and to be free of the actuatable portion for the other extreme position whereby said actuator can engage said actuatable portion to cause said lever to assume one of its positions at a radial position of the actuator.

2. The invention as defined in claim 1 in which the rotary member moves the actuator linearly along the axis of the rotary member a predetermined length per revolution and in which the actuatable portions are spaced apart a distance substantially equal to the predetermined movement.

3. The invention as defined in claim 2 in which the part of the actuator that engages the actuatable portion has a width along the axis that is less than twice the predetermined length to prevent actuation of two adjacent contact levers.

4. The invention as defined in claim 1 in which the means mounting the actuator includes a thread formed on the rotary member, a nut threadingly engaging said threads, and a lost motion connection between said nut and said actuator, said lost motion occurring in a plane perpendicular to the reciprocating radial movement of the actuator.

5. The invention as defined in claim 4 in which there are eccentric means for mounting the shaft and means for preventing rotation of the actuator with the shaft.

6. The invention as defined in claim 1 in which each of the contact levers is substantially identical and in which there are pivot means for pivotally mounting the contact levers with the movement from one position to another being a pivotal movement.

7. The invention as defined in claim 1 in which the contact levers are divided into two sets with each set having its contact lever actuatable portions in spaced apart relation in alignment with the axis of the rotary member, there being one set on each side of the axis, the actuator has two parts with one being on each side of the axis, said parts being movable with the actuator and spaced apart a distance transverse to the axis which is less than the distance from one set of actuatable portions to the other.

8. The invention as defined in claim 7 in which the distance between the parts is greater than the distance between the actuatable portions of the contact levers in the sets when they are all in the same position, whereby at least one part of the actuator engages the actuatable part of a contact lever at all positions of the actuator.

9. The invention as defined in claim 7 in which the actuatable portions of both sets of contact levers are spaced apart a distance substantially equal to the linear movement of the actuator caused by one revolution of the rotary member and in which the actuatable portions of one set are disposed one-half the movement parallel to the axis with respect to the other set.

References Cited

UNITED STATES PATENTS

| | | | |
|---|---|---|---|
| 1,904,646 | 4/1933 | Lindquist et al. | 200—47 X |
| 1,966,249 | 7/1934 | Larson | 200—47 X |
| 2,276,740 | 3/1942 | Saito | 200—47 |
| 2,430,458 | 11/1947 | Farrell | 74—424.8 |
| 2,431,929 | 12/1947 | Goff | 200—47 X |
| 2,556,572 | 6/1951 | Brinkhurst | 74—424.8 |
| 2,942,073 | 6/1960 | Barr. | |
| 2,761,041 | 8/1956 | Yarrick | 200—169 X |
| 3,250,865 | 5/1966 | Bleibtreu | 200—11 |
| 3,312,793 | 4/1967 | White | 200—18 X |

FOREIGN PATENTS

| | | |
|---|---|---|
| 850,078 | 12/1939 | France. |
| 1,141,359 | 12/1962 | Germany. |
| 207,829 | 12/1965 | Sweden. |

ROBERT K. SCHAEFER, Primary Examiner

R. A. YANDERHYE, Assistant Examiner

U.S. Cl. X.R.

200—16, 47, 153; 74—89.15, 424.8